United States Patent
Asghari et al.

(10) Patent No.: US 8,989,369 B1
(45) Date of Patent: Mar. 24, 2015

(54) USING MEDIA SERVER CONTROL MARKUP LANGUAGE MESSAGES TO DYNAMICALLY INTERACT WITH A WEB REAL-TIME COMMUNICATION CUSTOMER CARE

(71) Applicant: Sprint Communications Company L.P., Overland Park, KS (US)

(72) Inventors: Abdolreza Asghari, Santa Clara, CA (US); Mark J. Bonn, Granite Bay, CA (US); Ehtesham Khan, Santa Clara, CA (US); James D. Kirby, San Mateo, CA (US); Dominick Mangiardi, Fremont, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/183,517

(22) Filed: Feb. 18, 2014

(51) Int. Cl.
*H04M 3/00* (2006.01)
*H04M 5/00* (2006.01)
*H04M 3/51* (2006.01)

(52) U.S. Cl.
CPC .................................. *H04M 3/5133* (2013.01)
USPC ............ 379/265.09; 379/265.01; 379/265.02; 379/265.11

(58) Field of Classification Search
CPC ... H04M 3/51; H04M 3/5166; H04M 3/5175; H04M 3/5183; H04M 3/523; H04M 3/5232; H04M 3/5233; H04M 3/5237; H04M 3/5238; H04M 2203/1033; H04M 2203/2061; H04M 2207/40; H04M 2242/12; H04M 7/127; H04M 15/63; G06Q 10/06

USPC ............ 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS

| | | | |
|---|---|---|---|
| 8,126,722 B2 * | 2/2012 | Robb et al. | 705/1.1 |
| 8,385,532 B1 * | 2/2013 | Geist et al. | 379/265.03 |
| 2002/0037735 A1 * | 3/2002 | Maggenti et al. | 455/517 |
| 2003/0051037 A1 * | 3/2003 | Sundaram et al. | 709/227 |
| 2006/0101098 A1 * | 5/2006 | Morgan et al. | 707/204 |
| 2006/0230161 A1 * | 10/2006 | Bae et al. | 709/228 |
| 2008/0120599 A1 * | 5/2008 | I'Anson | 717/120 |
| 2009/0232129 A1 * | 9/2009 | Wong et al. | 370/352 |
| 2014/0012945 A1 * | 1/2014 | Barnhill et al. | 709/217 |
| 2014/0140495 A1 * | 5/2014 | Ristock et al. | 379/265.05 |
| 2014/0270109 A1 * | 9/2014 | Riahi et al. | 379/88.01 |

* cited by examiner

*Primary Examiner* — Khai N Nguyen

(57) ABSTRACT

A customer care system. The system comprises a transformation engine, configured to use SIP/hypertext transfer protocol (HTTP) signaling transcoding to invite the operator to the customer care session, map a SIP INFO MSCML payload to an interactive HTML web form, and transmit, to the operator, the HTML web forms transformed from SIP INFO MSCML payloads sent by the application server. The transformation engine is further configured to transmit, to the application server, SIP INFO MSCML payloads transformed from the HTML web forms sent by the operator, and use instructions from the SIP INFO MSCML payloads to script the operator's communication with the caller.

20 Claims, 8 Drawing Sheets

USING MEDIA SERVER CONTROL MARKUP LANGUAGE MESSAGES TO DYNAMICALLY INTERACT WITH A WEB REAL-TIME COMMUNICATION CUSTOMER CARE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Operator services typically use circuit switched based connectivity to provide a voice session from a customer to a customer care agent. Typically operators access back-office systems to resolve customer care problems through a web portal. The web browser platform has evolved to tightly couple signaling and media into the browser, for example a web real-time communication (WebRTC) capable browser to support audio and video media sessions from a browser compatible platform—laptops, tablets, workstations, smartphones, etc.

SUMMARY

In an embodiment, a customer care system is disclosed. The system comprises a web real-time communication (WebRTC) capable browser as an interface portal for a customer care operator, configured to identify registered operators, initiate a customer care session between a caller and the operator, display interactive hypertext markup language (HTML) web forms to the operator, and transmit inputs from the operator to an application server. The web real-time communication capable browser is further configured to define the interface portal with instructions contained in session initiation protocol (SIP) INFO media server control markup language (MSCML) payloads, wherein a SIP INFO MSCML payload is an MSCML payload encapsulated in a SIP INFO message, and script the operator's communication with the caller. The system further comprises a transformation engine, configured to use SIP/hypertext transfer protocol (HTTP) signaling transcoding to invite the operator to the customer care session, map a SIP INFO MSCML payload to an interactive HTML web form, and transmit, to the operator, the HTML web forms transformed from SIP INFO MSCML payloads sent by the application server. The transformation engine is further configured to transmit, to the application server, SIP INFO MSCML payloads transformed from the HTML web forms sent by the operator, and use instructions from the SIP INFO MSCML payloads to script the operator's communication with the caller.

In an embodiment, a method of managing a customer care system is disclosed. The method comprises using session initiation protocol (SIP)/hypertext transfer protocol (HTTP) signaling transcoding to invite a customer care operator to a customer care session with a caller, identifying registered customer care operators through a web real-time communication (WebRTC) browser, wherein the browser is an interface portal for the customer care operator, displaying the caller's disposition by the browser, displaying prior knowledge at a telephony application server (TAS) about the current customer care session, and displaying interactive hypertext markup language (HTML) web forms to the operator. The method further comprises transcoding SIP INFO media server control markup language (MSCML) payloads and HTML web forms by a transformation engine, transmitting, to the operator, the HTML web forms transformed from SIP INFO MSCML payloads sent by an application server, transmitting, to the application server, the SIP INFO MSCML payloads transformed from the HTML web forms sent by the operator, and defining the interface portal with instructions contained in the SIP INFO MSCML payloads. The method further comprises using instructions from the SIP INFO MSCML payloads to script the operator's communication with the caller, validating the caller's identity at the application server, and transferring the caller to a destination number when the caller's identity is validated.

In an embodiment, a method of managing a customer care system is disclosed. The method comprises using session initiation protocol (SIP)/hypertext transfer protocol (HTTP) signaling transcoding to invite a customer care operator to a customer care session with a caller, displaying interactive hypertext markup language (HTML) web forms to the operator, and mapping a SIP INFO media server control markup language (MSCML) payload to an interactive HTML web form by a transformation engine. The method further comprises transmitting, to the operator, the HTML web forms transformed from SIP INFO MSCML payloads sent by an application server, transmitting, to the application server, the SIP INFO MSCML payloads transformed from the HTML web forms sent by the operator, validating the caller's identity at the application server, and transferring the caller to a destination number when the caller's identity is validated.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
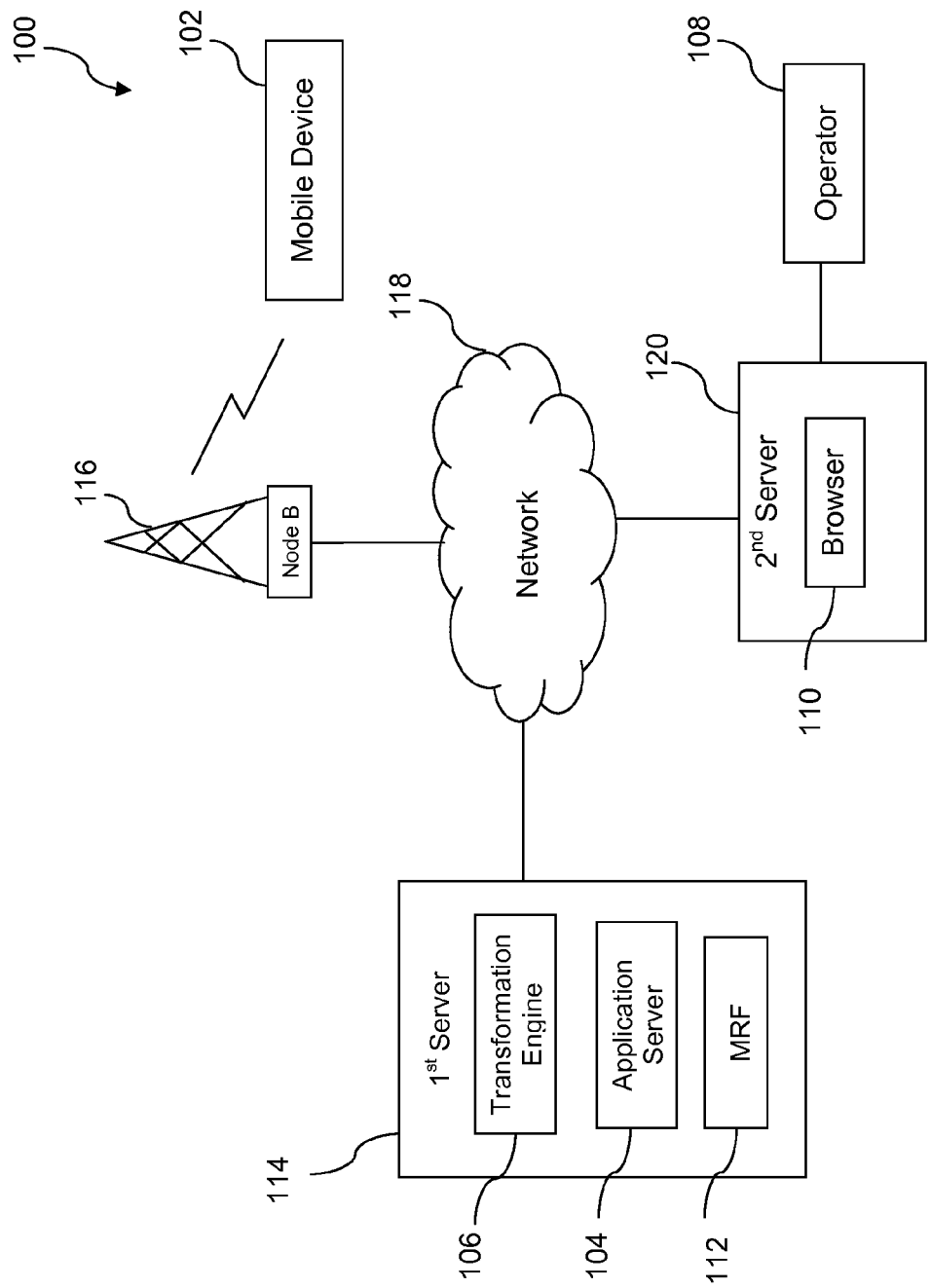
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In some circumstances, when more call originations are attempted in an area than can be supported at one time, for example on a single cell tower, privileged users may be granted special access and their call originations be handled in advance of call originations of unprivileged users. For example, during an emergency, a cell tower may receive more call origination attempts than it can handle at the same time. In this situation, a privileged or priority user, such as an emergency first responder, may be able to authenticate his or her privileged status by providing a special personal identification number and obtain an immediate wireless connection.

In emergency situations, so many people may try to make phone calls concurrently that the number of call requests may exceed the capacity of a base transceiver station from a wireless communication services provider. It may be desirable to queue up phone calls from first responders with priority in these circumstances. Said in other words, the phone call from a first responder may be provided a wireless communication link—even if other callers ahead of the first responder continue to wait and/or even if an ongoing normal priority call is dropped. When a first responder makes a phone call, for example with a mobile communication device, in an emergency, a communication services provider may desire to verify the identity of the caller before transferring the caller with priority to a destination number. Typically the caller may be asked by an interactive voice recognition (IVR) system to enter a personal identification number (PIN) or a password. However, the caller may not provide a correct personal identification number for a variety of reasons. For example, the caller may be under stress and may not remember the correct personal identification number right away. In existing systems, after a predefined number of personal identification number failures, the phone call may not be treated with priority by the communication services provider.

Under these circumstances, the caller may wish to engage a live operator to assist in completing the call. The operator may use a customer care system that may couple to or may be a part of an IP multimedia subsystem (IMS) that supports different communication modes, for example audio and video. The operator may work with the customer care system through a certain type of browser. The mobile device may communicate with an application server of the IP multimedia subsystem via the session initiation protocol (SIP). The application server may communicate with other nodes in the IP multimedia subsystem, for example a media resource function, via session initiation protocol also. On the other hand, the operator's browser may not recognize session initiation protocol but may recognize hypertext markup language (HTML). Thus, a transformation engine or gateway may also be introduced in the customer care system to transcode between nodes that operate with different protocols. The transformation engine may transcode session initiation protocol codes and hypertext markup language codes.

The present disclosure teaches a system and method for using media server control markup language (MSCML) messages to dynamically interact with a web real-time communication (WebRTC) customer care operator. A WebRTC capable browser may couple signaling and media into the browser. For example, the WebRTC browser may support audio and video media sessions from a browser compatible platform, for example a laptop computer, a tablet computer, a workstation, or a smart phone. The WebRTC browser allows the audio and video session to be controlled through the browser. The WebRTC browser allows customer care operators to register for receiving/making calls to/from a browser and provide the web portal framework to back-end systems desired to support the customer.

For example, the transformation engine may transcode codes from session initiation protocol (SIP), hypertext markup language (HTML), and/or JavaScript. For example, each MSCML payload via a SIP INFO request may be mapped into a unique interactive HTML web form. Thus an MSCML payload on a SIP INFO request from an application server in the customer care system may be transformed to an HTML web form and transmitted through hypertext transfer protocol (HTTP) to the WebRTC capable browser. An HTML web form may be an HTML 5 webpage with JavaScript application programming interfaces (APIs). Similarly, information from an HTML web form from the WebRTC capable browser may be transformed by the transformation engine into an MSCML payload on a SIP INFO request and transmitted to the application server.

The application server may send commands/requests to the operator via the transformation engine and the browser. The operator may be instructed by the application server to request the caller for answer(s) to personal identification related question(s). For example, a separate voice link may be established between the operator and the caller. During the voice session, the operator may ask the caller the address of his/her organization, supervisor's name, or another personal identification related question. The operator may also collect a destination number from the caller. The operator may input the collected answer(s) to the personal identification related question(s) and the destination number into the interactive HTML web form. The browser may transmit content extracted from the HTML web form to the application server for validation. The transformation engine may transcode the HTML web form to a SIP INFO MSCML payload for the browser and transmit the transformed SIP INFO MSCML payload to the application server. The application server may transmit back the validation results to the browser. If the caller is verified to be a first responder, the application server may transmit instructions on an MSCML message via a SIP INFO request to the operator and instruct the operator to inform the caller of being transferred to the destination number. The application server may then transfer the caller to the destination number.

Thus, when the first responder accidentally provides a false personal identification number, when the first responder does not remember the personal identification number, or when a supervisor of the first responder accidentally provides the first responder with a false personal identification number, the disclosed system promotes resolving the problem by having a live operator verify the identity of the first responder and assist in completing the call with the disclosed system and method. The disclosed system provides this technical solution by, in part, effecting a bridge between two unlike and/or incompatible communication systems.

Turning now to FIG. 1, a communication system 100 is described. In an embodiment, the communication system 100 comprises a first server 114, a second server 120, an operator 108, and a plurality of mobile communication devices 102. The first server 114 may comprise a transformation engine 106, an application server function 104, and a media resource function (MRF) 112. The second server 120 may comprise a browser 110. The mobile device 102 may be configured to use a universal mobile telecommunications system terrestrial radio access network that comprises an enhanced Node B (eNB) 116 to establish a wireless communication link with a packet core network 118. In another embodiment, another radio access network and/or communication network may be used, for example a radio access network have base transceiver stations (BTSs), The first server 114 and the second server 120 may also have access to the network 118. In an embodiment, the first server 114 and the second server 120 may locate in the same wired or wireless local area network (LAN). The network 118 may comprise any combination of private and public networks. In an embodiment, the transformation engine 106 may be hosted and executed on the second server 120.

The first server 114 and the second server 120 may access the network 118 through wired or wireless access networks. The wired access network may be abstracted in different ways and may comprise cable modems and Ethernet routers, switches, or hubs. The wireless access network may also be abstracted in different ways and may comprise wireless access points, cable modems, Ethernet or wireless routers, switches, or hubs, servers and data storages such as home location registers (HLRs) or servers that implement the functionality of home location registers, visitor location registers (VLRs) or servers that implement the functionality of visitor location registers, mobile management entities, a universal mobile telecommunications system terrestrial radio access network, packet core network, and other network nodes that are specifically associated with providing wireless access and connectivity to the server computers.

It is understood that the system 100 may comprise any number of mobile devices 102, any number of operators 108, and any number of enhanced Node Bs 116. The collectivity of enhanced Node Bs 116 may be said to comprise a universal mobile telecommunications system terrestrial radio access network, in that these enhanced Node Bs 116 may provide a radio communication link to the mobile devices 102 to provide access to the network 118. The universal mobile telecommunications system terrestrial radio access network may be abstracted in different ways and may comprise, in addition to the enhanced Node Bs 116, components from the wireless access network.

The radio transceiver of the mobile communication device 102 may communicate with the base transceiver station 116 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile device 102 may be any of a mobile phone, a personal digital assistant (PDA), a media player, a laptop computer, a tablet computer, a notebook computer, or another network/communications capable device. In an embodiment, the mobile communication device 102 may have other components (not shown) such as a near field communication (NFC) radio transceiver, a wireless local area network (WLAN) radio transceiver, or other components.

The transformation engine 106, the application server 104, and the media resource function 112 may be implemented using one or more server computers. The transformation engine 106, the application server 104, and the media resource function 112 may locate in one computer—for example a server computer, in three different computers—for example, a first server computer for the transformation engine 106, a second server computer for the application server 104, and a third server computer for the media resource function 112, in multiple different computers—for example, a first group of multiple server computers for the transformation engine 106, a second group of multiple server computers for the application server 104, and a third group of multiple computers for the media resource function 112, or in some other combination of computers. In an embodiment, when the transformation engine 106, the application server 104, and the media resource function 112 do not locate in one computer, the transformation engine 106, the application server 104, and the media resource function 112 may share the same wired or wireless local area network. The first server 114 and the second server 120 may be said to be components of a customer care system. The customer care system may couple to or may be a part of an IP multimedia subsystem (IMS).

The media resource function 112 may also be referred to as a media server. Each media resource function 112 comprises a media resource function controller (MRFC) and a media resource function processor (MRFP). In an embodiment, the media resource function 112 may provide media-related functionality, for example media manipulation (e.g. voice stream mixing) and playing tones and announcements. For example, when a caller is validated as a first responder and the caller is about to be directed to the destination number, the media resource function 112 may play a final announcement to the caller.

In an embodiment, the application server 104 may be an application instead of a piece of hardware. The application server 104 may host and/or execute the IP multimedia subsystem service logic. For example, the application server 104 may provide the service logic for invoking the media resource function 112 to support call progress tones and announcements. The application server 104 may initiate a communication session and/or terminate a communication session. The application server 104 may direct a call session to an operator when identity validation of the caller fails. The application server 104 may manage a call session progress by sending commands/requests to relevant nodes in the customer care system. Additionally, the application server 104 may validate identity information of a caller to determine whether the call may be directed to a destination with priority.

For example, when a caller makes a phone call through a communication network of a communication services provider, the caller initiates a request to start a communication session. The application server 104 may generate the request to start the communication session after the request from the caller is received at the application server 104. The application server 104 may send the generated request to a media resource function 112 and initiate a call to a destination number that was provided by the phone.

As another example, when an emergency or a disaster occurs in an area, phone lines may be jammed with a number of people making phone calls which exceeds the capacity of the communication network around the area. For example, if an aircraft crashes in an urban area, surrounding people may make phone calls about the incident and the carrier wireless network access around the area may be jammed. A first responder may desire to make a phone call with wireless network attachment priority after the disaster. A first responder may be a fire personnel, police personnel, an emergency medical personnel, or another type of emergency personnel. When the identity of the first responder is validated, for example with a personal identification number (PIN) or a password, the phone call from the first responder may be placed with priority through the core edge and core of the wireless network. Said in other words, the phone call may be provided a wireless communication link by the enhanced Node B 116—even if other callers ahead of the first responder continue to wait and/or even if an ongoing normal priority call is dropped. However, when the first responder provides a wrong personal identification number or when the first responder could not provide a personal identification number, the phone call may typically not be transferred to a destination number.

In an embodiment, the first responder may be forwarded to an operator 108 by the application server 104 after a predefined number of personal identification number failures, for example three personal identification number failures. Alternatively, the first responder may choose to speak to the operator 108 in the beginning and may be transferred by the application server 104 to the operator 108 even before the first responder is asked for a personal identification number. For example, the application server 104 may initiate a call session with a customer care operator 108 and the caller. For example, the application server 104 may generate a first request to initiate a communication session with and transmit the first request to a mobile device 102 of the caller, the first responder, if the caller is making a phone call with the mobile device 102. The application server 104 may generate a second request to initiate the communication session with and transmit the second request to a browser 110. The transformation engine 106 may obtain and/or transform the request to a format that is understandable by the browser 110 and send the transformed request to the browser 110. The browser 110 may display the request to the operator 108 to start a communication session with the caller.

The application server 104 may validate the caller identification before directing the call to a destination number. For example, the application server 104 may send a request to browser 110 through the transformation engine 106 to collect identification related information and validate the collected identification information at the application server 104. For example, the application server 104 may send a media server control markup language payload (MSCML) encapsulated in a session initiation protocol (SIP) INFO request to the browser 110 via the transformation engine 106 with instructions for the operator 108 to collect a personal identification number and/or a destination number. Answer(s) to personal identification related question(s) may also be referred to as a personal identification number herein. When the transformation engine 106 sends the collected personal identification number and/or the destination number to the application server 104 for the browser 110, the application server 104 may validate the caller identity. For example, the application server 104 may check the caller identity against records in a data store to determine whether the caller is a first responder or not. Additionally, the application server 104 may check the destination number against records in the data store to determine whether the destination number is an emergency-related phone number.

When the validation is completed at the application server 104, the application server 104 may transmit the validation results to the browser 110 via the transformation engine 106. The transformation engine 106 may transform the validation results and transmit the transformed validation results to the browser 110. When the caller is determined to be a first responder and the destination number is emergency related, the operator 108 may send a request to direct the call session to the destination number. Alternatively, when the caller is determined to be a first responder, the operator 108 may send a request to direct the call session to the destination number.

The application server 104 may send a request to the media resource function 112 indicating the caller is being invited to participate in a call session, with the destination number this time. The media resource function 112 may play corresponding tones and/or announcements. For example, the media resource function 112 may play a final announcement to inform the caller of being directed to the destination number after a request to play a final announcement from the application server 104 is received at the media resource function 112. The application server 104 may then direct the caller to the destination number. For example, the application server 104 may send a request to the destination number to initiate a call session with the caller. Additionally/alternatively, when the identity of the caller is validated, the application server 104 may send a separate HTML page on a SIP INFO MSCML payload to instruct the operator 108 to inform the caller of being transferred to the destination number. An MSCML payload encapsulated in a SIP INFO message may be referred to herein as a SIP INFO MSCML payload.

In an embodiment, the browser 110 may be a web real-time communication capable browser that communicates via JavaScript application programming interfaces (APIs) and/or hypertext markup language 5 (HTML5), for example a Chrome browser of a stable version with web real-time communication APIs, a Firefox browser of a stable version with web real-time communication APIs, an Opera browser of a stable version with web real-time communication APIs, or another web real-time communication capable browser. Web real-time communication capable browsers may support voice calling, video chat, and/or peer-to-peer file sharing without plugins. The browser 110 may be an interface portal for the customer care operator 108. For example, customer care operators 108 may be registered through the browser 110. The browser 110 may display relevant information in interactive hypertext markup language (HTML) web forms to the operator 108. Additionally, the browser 110 may transmit inputs from the operator 108 to the application server 104 via the transformation engine 106.

For example, the browser 110 may display visual ring to the operator 108 in case of an incoming call. The browser 110 may request identification validation information from the operator 108 to determine whether the operator 108 is authorized to handle a communication session, for example an audio session from a first responder. The operator 108 may input a personal identification number into the browser 110 and the browser 110 may validate the identity of the operator 108, for example by communicating with the application server 104 or a data store that keeps records for operator access rights information. When the identification of the operator 108 is validated, the browser may display and/or activate interactive buttons to the operator 108.

The operator 108 may control an audio or video session through the browser 110, for example with the interactive buttons. For example, the browser 110 may comprise interactive buttons such as accept, drop, hold, transfer, conference, or another button for the operator 108 to choose from to control an audio or video session. In an embodiment, an authorized operator 108 may choose an "accept" button on the browser 110 to join an incoming audio or video session. The browser 110 may be defined with information contained in MSCML payloads in SIP INFO requests. For example, the MSCML payloads from the application server 104 may be transcoded by the transformation engine 106 to HTML web forms and transmitted to the browser 110. The interactive HTML web forms may be defined and/or updated with information in the MSCML payloads.

For example, instructions from the SIP INFO MSCML payloads may be used to script the operator's communication with the caller. For example, instructions may be transmitted by the application server 104 on a MSCML payload, transformed into an HTML web form by the transformation engine 106, and displayed by the browser 110 to instruct the operator 108 to ask the caller to hold the call for a moment while the operator verifies the identification information of the caller with the application server 104. After the identity of the caller is verified, a separate HTML web form may be transformed by the transformation engine 106 from content extracted from on a MSCML payload sent by the application server 104, and displayed by the browser 110 to instruct the operator 108 to inform the caller of being directed to a destination number.

Prior knowledge at a telephony application server (TAS) about the current customer care session may be displayed by the browser 110 to the operator 108. A telephony application server may be an application that provides application server(s) with telephony services, for example digit analysis, routing, call setup, call waiting, call forwarding, conferencing, or another type of call processing service. In an embodiment, a telephony application server may store information of a customer care session and provide this information to the operator 108 via the browser 110. For example, if the caller is a first responder with three previous personal identification number failures, the telephony application server 104 may transmit this information in a MSCML payload in a SIP INFO request to the browser 110 via the transformation engine 106. The transformation engine 106 may transform the MSCML payload into an HTML web form and transmit the HTML web form to the browser 110. The browser 110 may update the current HTML web form with updated information from the newly received HTML web form, for example delete information or add information based on incremental content from the current HTML web form to the newly received HTML web form. Alternatively, the browser 110 may replace the current HTML web form with the newly received HTML web form. In an embodiment, when the operator 108 sees the information on the browser 110 that the caller is a first responder with three previous personal identification number failures, time that typically may be used to ask the caller why he/she called may be saved.

As another example, the browser 110 may display the caller's disposition information. For example, if the caller is a responder that chose to speak to an operator 108, this disposition information may be transmitted from the telephony application server to the transformation engine 106 on an MSCML payload encapsulated in a SIP INFO request. The transformation engine 106 may transform the MSCML payload to an HTML web form and transmit the HTML web form to the browser 110. The browser 110 may display this caller disposition information to the operator 108 with the received HTML web form.

In an embodiment, the transformation engine 106 may be a component that transcodes for the application server 104 and the browser 110. The transformation engine 106 may also be referred to as a WebRTC engine herein. A single transformation engine 106 may work with more than one operator 108. The browser 110 and the transformation engine 106 may be said to form a WebRTC system. The transformation engine 106 may transmit the transformed codes from the application server 104 to the browser 110. The transformation engine 106 may also transmit the transformed codes from the browser 110 to the application server 104. For example, the transformation engine 106 may transform SIP INFO MSCML payloads from the application server 104 into HTML web forms and transmit the HTML web forms to the browser 110. The transformation engine 106 may transform HTML web forms from the browser 110 into SIP INFO MSCML payloads and transmit the MSCML payloads to the application server 104.

The transformation engine 106 may communicate with the application server 104 in a similar way that a media resource function 112 may communicate with the application server 104 in a typical existing IP multimedia subsystem. The transformation engine 106 may communicate with the application server 104 with SIP requests and responses. The transformation engine 106 may communicate with the browser 110 with HTML web forms via hypertext transfer protocol (HTTP). For example, the transformation engine 106 may use session initiation protocol (SIP)/hypertext transfer protocol (HTTP) signaling transcoding to invite a customer care operator 108 to a customer care session with a caller. For example, when an application server 104 transmits a SIP INVITE request to invite an operator 108 to a communication session, the application server 104 may first transmit the SIP INVITE request to a transformation engine 106. The transformation engine 106 may transform the SIP INVITE request to a WebSocket request. The Websocket protocol may be a transport layer on top of transmission control protocol (TCP). The WebSocket connection handshake is based on hypertext transfer protocol and the handshake procedure is designed to reuse the existing hypertext transfer protocol infrastructure.

SIP INFO MSCML payloads from the application server 104 may comprise instructions for the operator 108 to collect a personal identification number and a destination number from the caller. The transformation engine 106 may transform the MSCML payload to an HTML web form and transmit the HTML web form to the browser 110. The browser 110 may display the instructions to the operator 108. The instructions may comprise personal identification related question(s), for example supervisor name of the caller.

The operator 108 may talk to the caller in a voice session and ask the caller at least one of the personal identification related questions. The operator 108 may also ask the caller for a destination number. The operator 108 may input the answer(s) to corresponding personal identification related question(s) and the destination number into a corresponding HTML web form on the browser 110. The browser 110 may transmit the HTML web form with the answer(s), the corresponding question(s), and the destination number to the transformation engine 106. The transformation engine 106 may transform the HTML web form to an MSCML payload and transmit the MSCML payload encapsulated in a SIP INFO request to the application server 104. The application server 104 may validate the caller identification by determining whether the answer(s) to the personal identification related question(s) are correct, for example by checking with a data store that keeps records for personal identification related questions and answers.

In an embodiment, the application server 104 may transmit the validation results to the transformation engine 106 in an MSCML payload encapsulated in a SIP INFO request. The transformation engine 106 may transform the MSCML payload to an HTML web form. In an embodiment, each MSCML payload may be mapped to a unique HTML web form. The transformation engine 106 may transmit the HTML web form with the validation results to the browser 110 and the browser 110 may display the HTML web form to the operator 108. When the identity of the caller is validated, the operator 108 may send a request to the application server 104 to transfer the caller to the destination number, for example by pushing a corresponding button on the HTML web form on the browser 110. The request may be in the form of an HTML web form and may be received by the transformation engine 106 first. The transformation engine 106 may transform the HTML web form to an MSCML payload and transmit the MSCML payload encapsulated in a SIP INFO request to the application server 104.

The application server 104 may transmit instructions in a SIP INFO MSCML payload that may be transformed into a separate HTML page by the transformation engine 106. The instructions may be displayed by the browser 110 to the operator 108 and may instruct the operator 108 to inform the caller of being directed to the destination number. The application server 104 may terminate the session with the operator 108 by sending a SIP INFO MSCML payload. The transformation engine 106 may transform the MSCML payload to an HTML page and transmit the HTML page to the browser 110. Then the application server 104 may transfer the caller to the destination number.

Figure 2A:
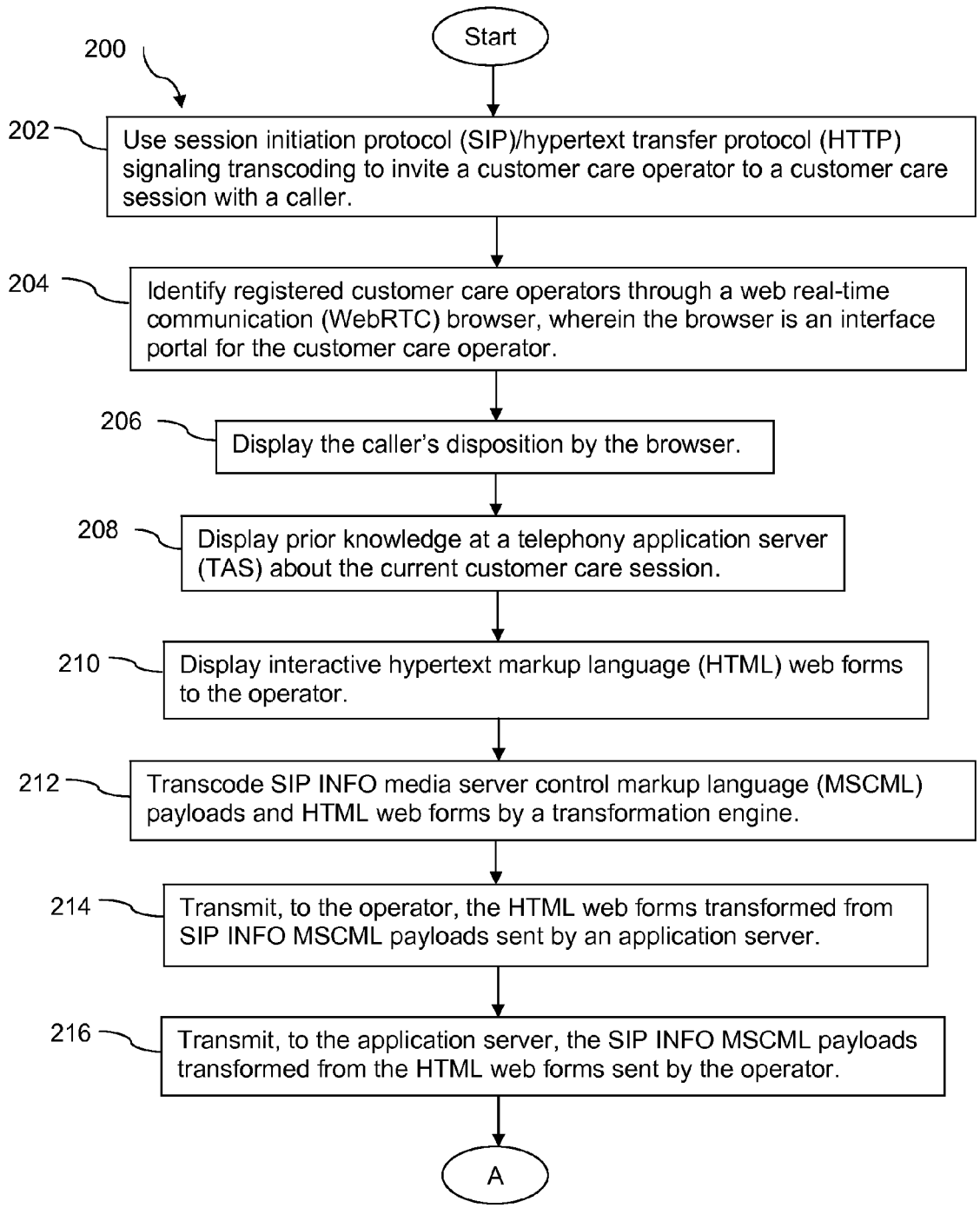
FIG. 2A and FIG. 2B is a flow chart illustrating a method according to an embodiment of the disclosure.
Figure 2B:
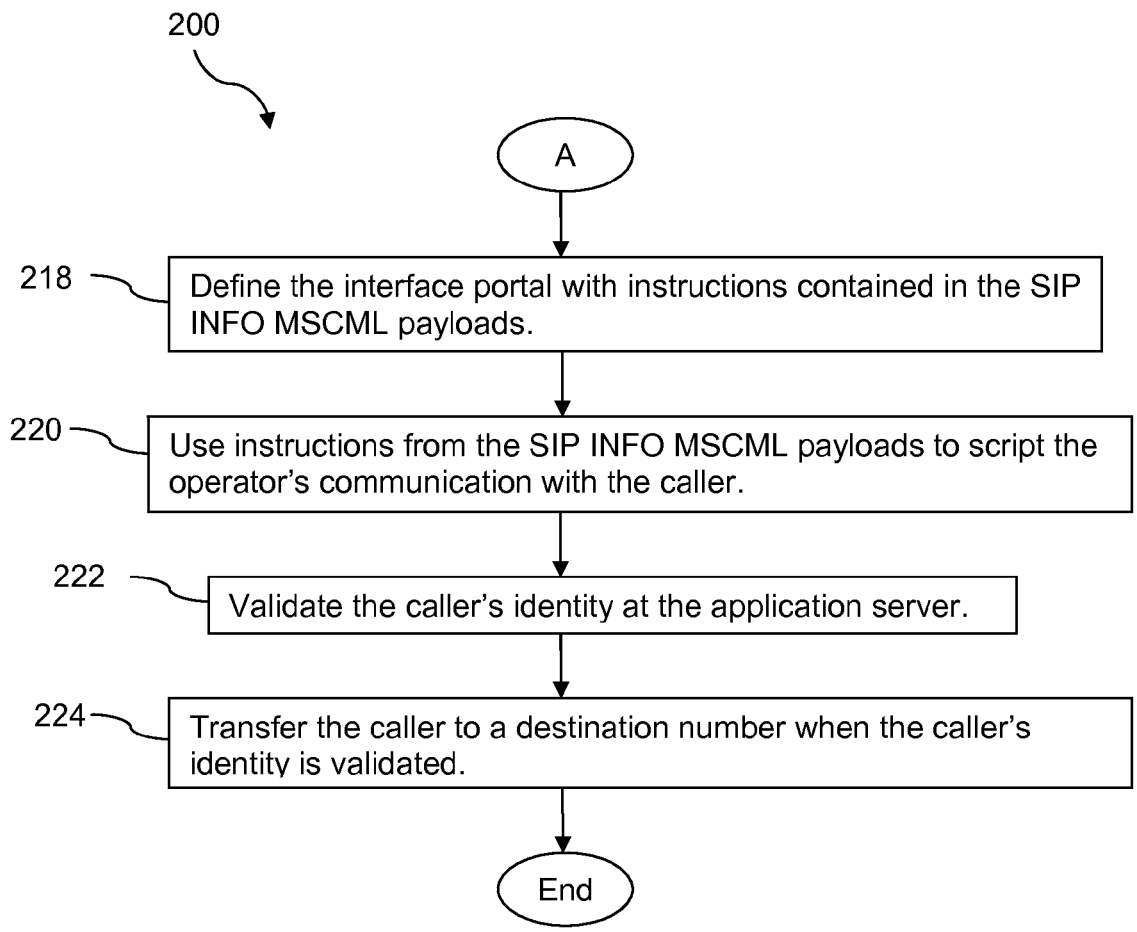

Turning to FIG. 2A and FIG. 2B, a method 200 is described. At block 202, session initiation protocol (SIP)/hypertext transfer protocol (HTTP) signaling transcoding is used to invite a customer care operator to a customer care session with a caller. For example, the transformation engine 106 may transcode session initiation protocol and hypertext transfer protocol codes to invite the customer care operator 108 to a customer care session with a caller when the caller is a first responder. At block 204, registered customer care operators are identified through a web real-time communication (WebRTC) browser, wherein the browser is an interface portal for the customer care operator. For example, the operator 108 may be asked to provide a personal identification number through the browser 110. The browser 110 may be a web real-time communication capable browser that conducts voice calling, video chat, and peer-to-peer file sharing without plugins. The authorization of the operator 108 to handle certain call sessions, for example a call from a first responder, may also be determined.

At block 206, the caller's disposition is displayed by the browser. For example, if the caller chose to speak to the operator 108, this disposition information may be displayed to the operator by the browser 110. Alternatively, if the caller has failed a predefined number of personal identification number trials, the caller may also be transferred to the operator 108. At block 208, prior knowledge at a telephony application server (TAS) about the current customer care session is displayed. For example, if the telephony application server has information that the caller called as a first responder in a disaster, the telephony application server may transmit the information to the browser 110, and the browser 110 may display the information to the operator 108. This way, time to ask why the caller called may be saved.

At block 210, interactive hypertext markup language (HTML) web forms are displayed to the operator. For example, hypertext markup language web forms may be displayed to the operator 108 by the browser 110. Visual ring may be displayed to the operator 108 in case of an incoming call. Interactive buttons may also be displayed to the operator 108 on the hypertext markup language web forms. The operator 108 may push the interactive buttons to control call sessions. For example, the operator 108 may push a "drop" button to reject an incoming call. At block 212, SIP INFO media server control markup language (MSCML) payloads and HTML web forms are transcoded by a transformation engine. For example, MSCML payloads embedded in a SIP INFO request may be transcoded to HTML web forms by the transformation engine 106. HTML web forms may also be transcoded to MSCML payloads by the transformation engine 106. The mobile device 102 may communicate with the application server 104 via a gateway, for example a media gateway (MGW) with integrated services for digital network (ISDN) user part (ISUP) over message transfer part (MTP), which may be transformed by the media gateway into the session initiation protocol. The media gateway may communicate with the application server 104 via the session initiation protocol. Additionally, the application server 104 may communicate with the media resource function 112 via session initiation protocol. On the other hand, the browser 110 may not recognize session initiation protocol messages but may recognize hypertext transfer protocol messages. The transformation engine 106 may transcode session initiation protocol messages and hypertext transfer protocol messages. Thus, the browser 110 may communicate with the application server 104 via the transformation engine 106.

At block 214, the HTML web forms transformed from SIP INFO MSCML payloads sent by an application server are transmitted to the operator. For example, when the application server 104 transmits MSCML payloads encapsulated in SIP INFO messages, the transformation engine 106 may obtain the MSCML payloads and transform the MSCML payloads to HTML web forms. Each MSCML payload may be mapped to a unique HTML web form. The transformed HTML web form may be transmitted via hypertext transfer protocol to the browser 110. The HTML web form may then be displayed to the operator 108 by the browser 110. At block 216, the SIP INFO MSCML payloads transformed from the HTML web forms sent by the operator are transmitted to the application server. For example, when the operator inputs feedback to the browser 110 via an HTML web form, the browser may transmit the HTML web form to the application server 104. The transformation engine 106 may obtain the HTML web form from the browser 110 and transform the HTML web form to an MSCML payload encapsulated in a SIP INFO message. The transformation engine 106 may transmit the transformed MSCML payload encapsulated in the SIP INFO message to the application server 104.

At block 218, the interface portal is defined with instructions contained in the SIP INFO MSCML payloads. For example, the interface portal, the browser 110, may be defined with instructions contained in the SIP INFO MSCML payloads from the application server 104. The transformation engine 106 may transform the SIP INFO MSCML payloads to HTML web forms and the browser 110 may define/update the browser based on information in the HTML web forms. For example, the browser 110 may replace a current HTML web form displayed by the browser 110 with a newly received HTML web form. At block 220, instructions from the SIP INFO MSCML payloads are used to script the operator's communication with the caller. For example, instructions from the SIP INFO MSCML payloads may be displayed on HTML web forms to script the operator's communication with the caller. In an embodiment, the operator 108 may be instructed to request answer(s) to personal identification related question(s) from the caller. The operator 108 may input the answer(s) to the HTML web form. The HTML web form with the answer(s) may be transmitted by the browser 110, transformed to an MSCML payload encapsulated in a SIP INFO message by the transformation engine 106, and transmitted to the application server 104.

At block 222, the caller's identity is validated at the application server 104. For example, the answer(s) to the personal identification related question(s) may be validated at the application server 104. The validation results may be transmitted by the application server 104 back to the browser 110 and displayed to the operator 108. At block 224, the caller is transferred to a destination number when the caller's identity is validated. For example, the operator 108 may be instructed to ask the caller for a destination number. When the identification of the caller is validated at the application server 104 and the validation result is transmitted to the browser 110, the operator 108 may be instructed to transfer the caller to the destination number.

Figure 3:
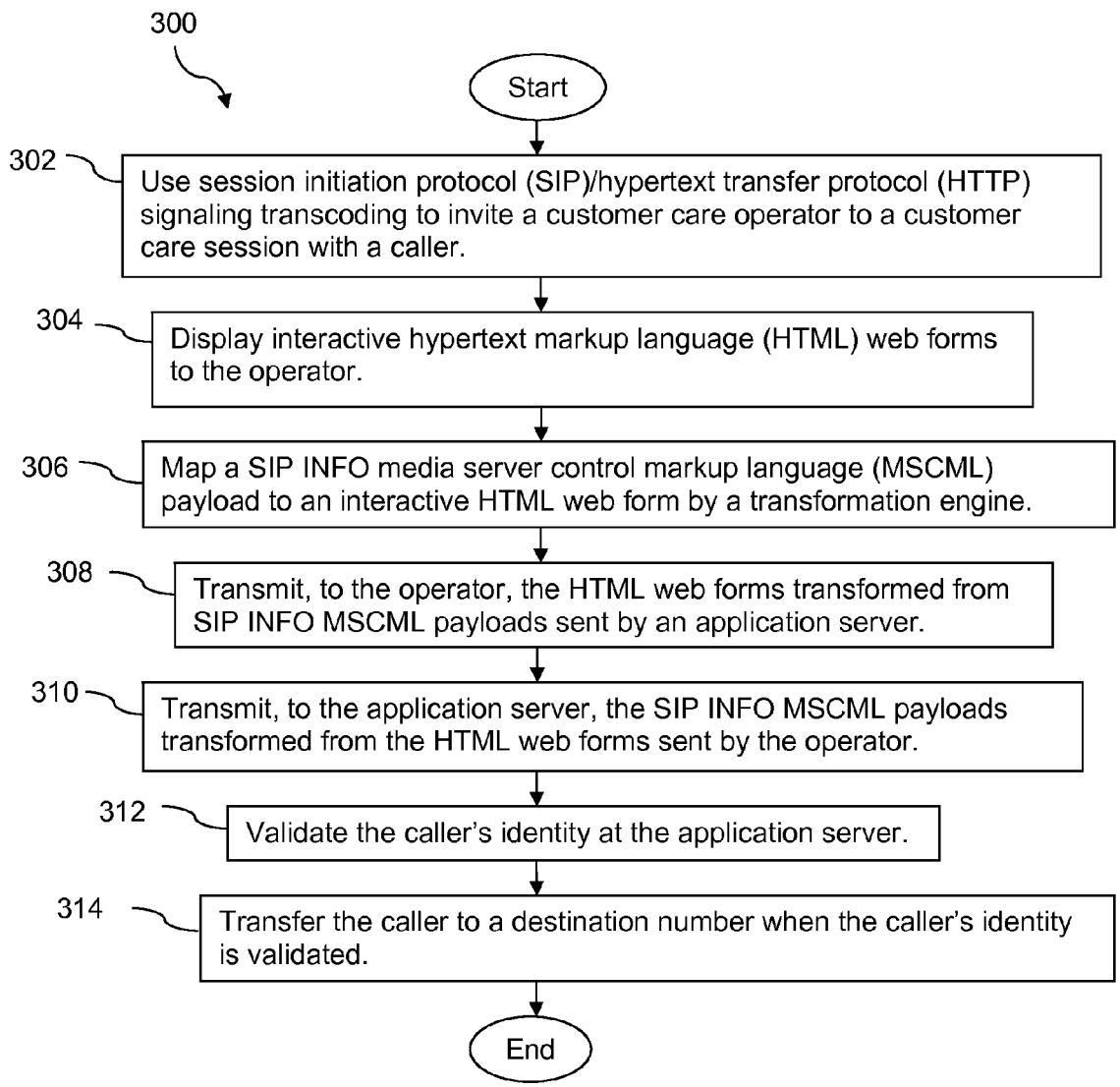
FIG. 3 is a flow chart illustrating another method according to an embodiment of the disclosure.

Turning now to FIG. 3, a method 300 is described. At block 302, session initiation protocol (SIP)/hypertext transfer protocol (HTTP) signaling transcoding is used to invite a customer care operator to a customer care session with a caller. For example, session initiation protocol and hypertext transfer protocol codes may be transcoded by the transformation engine 106. The application server 104 may transmit a request via session initiation protocol to the browser 110. The transformation engine 106 may obtain the request in session initiation protocol code and transform the code to be transmitted via hypertext transfer protocol to the browser 110. When the request via hypertext transfer protocol is received at the browser 110, the customer care operator 108 may be invited to a customer care session with a caller by the browser 110. At block 304, interactive hypertext markup language (HTML) web forms are displayed to the operator 108. For example, visual ring may be displayed on an interactive HTML web form by the browser 110 to the operator 108 and the operator 108 may choose to accept the call by pushing an "accept" button on the HTML web form.

At block 306, a SIP INFO media server control markup language (MSCML) payload is mapped to an interactive HTML web form by the transformation engine 106. At block 308, the HTML web forms transformed from SIP INFO MSCML payloads sent by the application server 104 are transmitted to the operator 108. At block 310, the SIP INFO MSCML payloads transformed from the HTML web forms sent by the operator 108 are transmitted to the application server 104. At block 312, the caller's identity is validated at the application server 104. At block 314, the caller is transferred to a destination number when the caller's identity is validated. For example, the caller may be transferred to a destination number when the caller's identity is validated by the application server 104.

Figure 4:
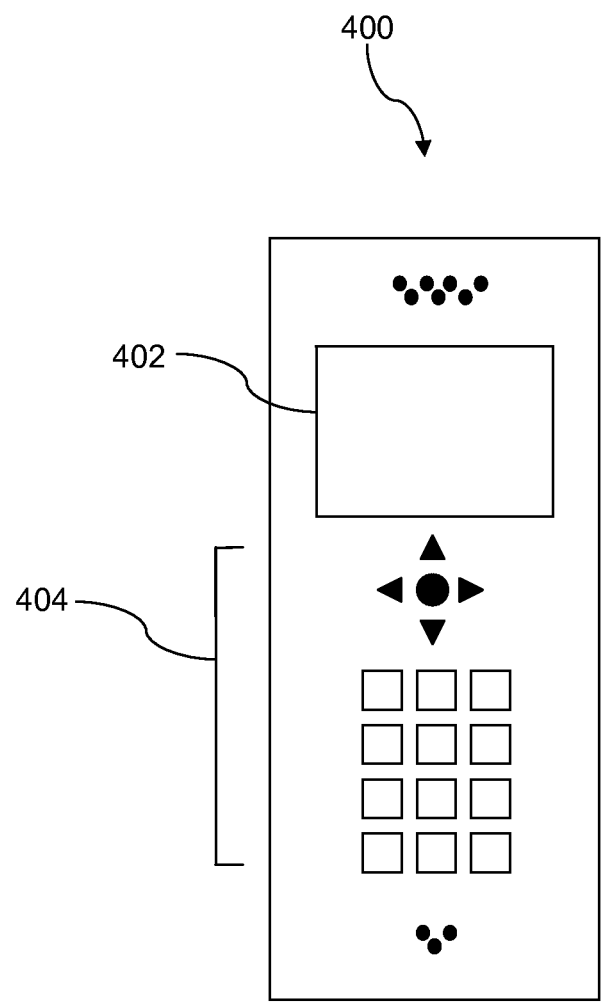
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
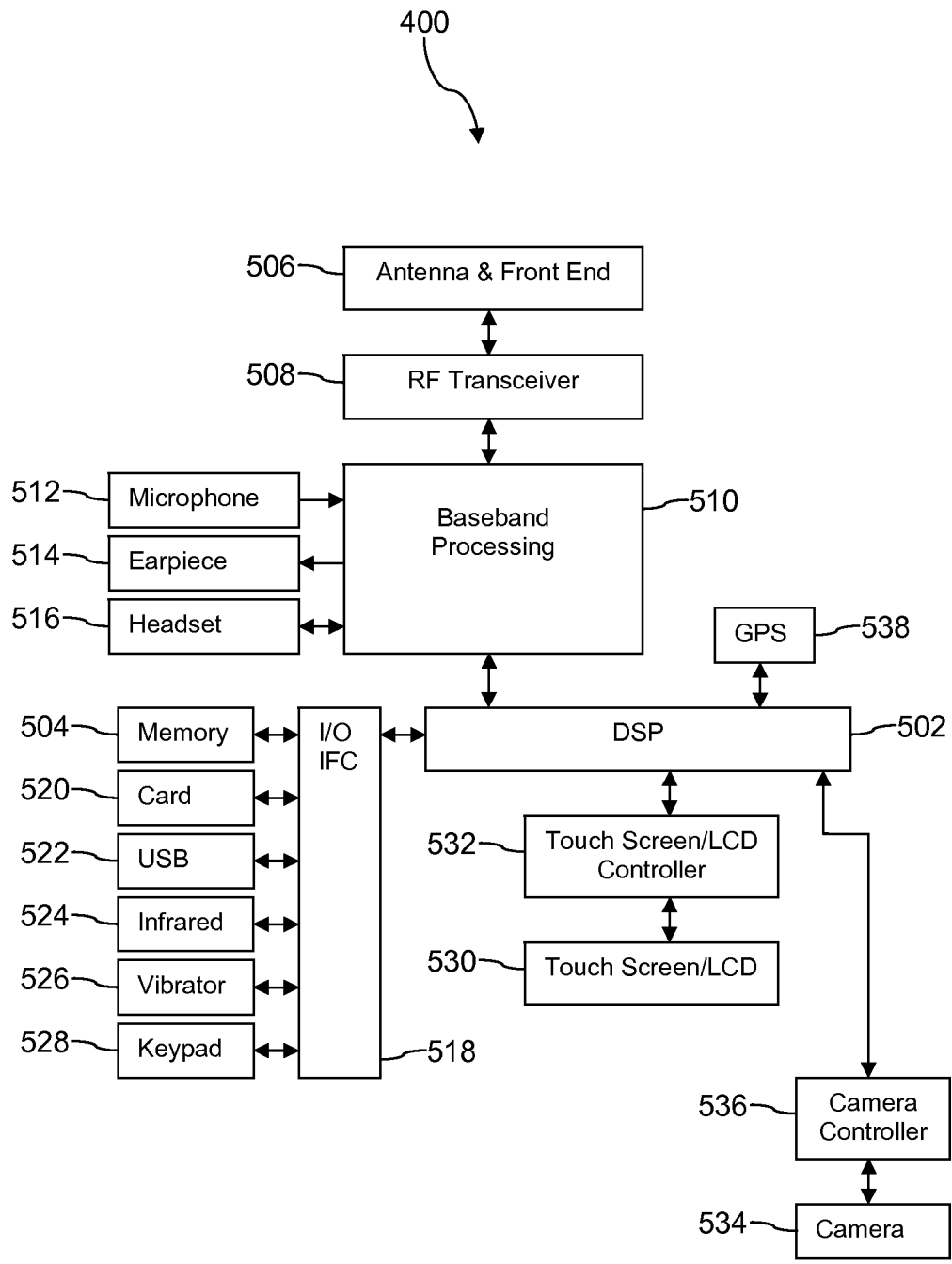
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
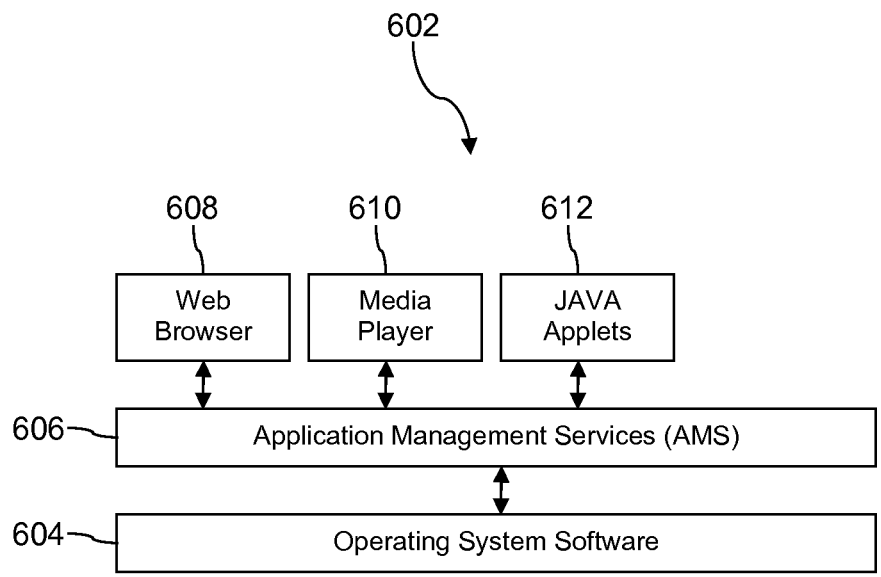
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
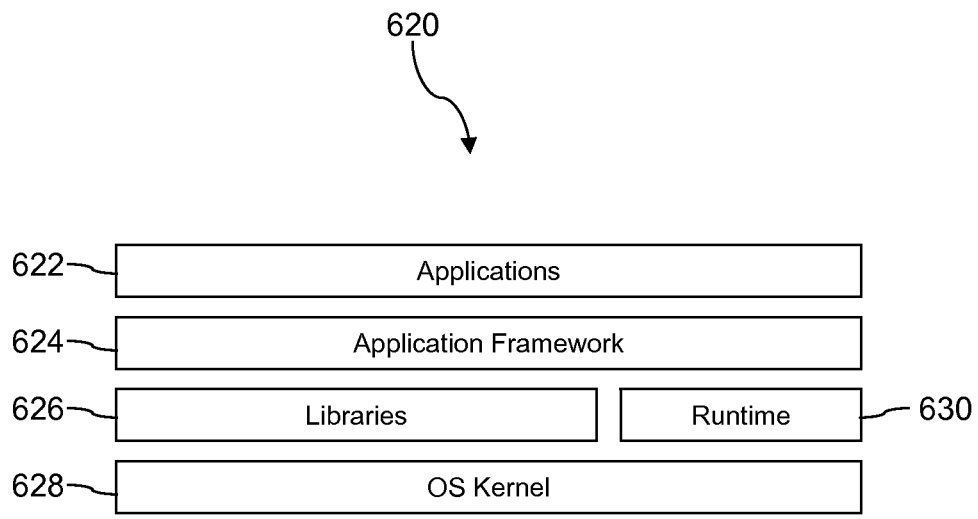
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
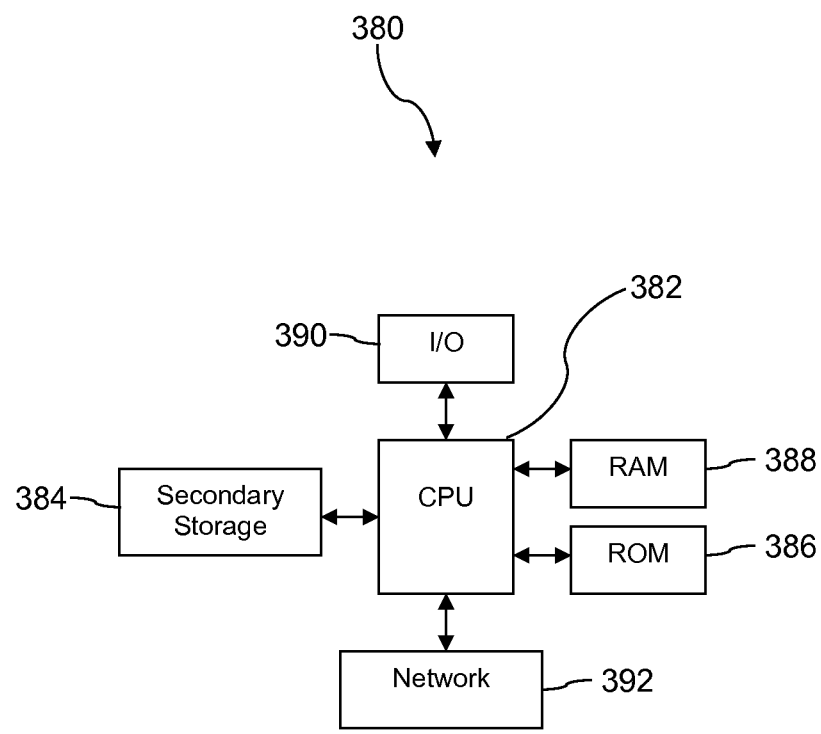
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A customer care system, comprising:
   a computer comprising:
   a non-transitory memory,
   at least one processor, and
   a web real-time communication (WebRTC) capable browser as an interface portal for a customer care operator, that upon execution by the at least one processor is configured to:
   identify the customer care operator as a registered operator,
   initiate a customer care session between a caller and the registered operator,
   display interactive hypertext markup language (HTML) web forms to the registered operator,
   transmit inputs from the registered operator to an application server,
   define the interface portal with instructions contained in session initiation protocol (SIP) INFO media server control markup language (MSCML) payloads, wherein a SIP INFO MSCML payload is an MSCML payload encapsulated in a SIP INFO message, and
   script the registered operator's communication with the caller; and
   a WebRTC server comprising:
   a non-transitory memory,
   at least one processor, and
   a transformation engine, that upon execution by the at least one processor is configured to:
   use SIP/hypertext transfer protocol (HTTP) signaling transcoding to invite the registered operator to the customer care session,
   map a SIP INFO MSCML payload to an interactive HTML web form, transmit, to the registered operator, the HTML web forms transformed from SIP INFO MSCML payloads sent by the application server, transmit, to the application server, SIP INFO MSCML payloads transformed from the HTML web forms sent by the registered operator, and use instructions from the SIP INFO MSCML payloads to script the registered operator's communication with the caller.

2. The system of claim 1, wherein the WebRTC browser has interactive buttons and displays visual ring to the registered operator in case of an incoming call.

3. The system of claim 1, wherein the SIP INFO MSCML payload comprises instructions for the registered operator to collect a personal identification number (PIN) and a destination number from the caller.

4. The system of claim 3, wherein the obtained PIN is transmitted to the application server for identity validation of the caller.

5. The system of claim 4, wherein the validation result by the application server is transmitted to the registered operator.

6. The system of claim 5, wherein the caller is verified to be whether a first responder from the government or not.

7. The system of claim 6, wherein when the identity of the caller is validated, the application server sends a separate HTML page on a SIP INFO MSCML payload that instructs the operator to inform the caller of being directed to the destination number.

8. The system of claim 1, wherein the caller chooses to speak to the customer care operator or is directed to the customer care operator by the application server after three PIN failures.

9. A method of managing a customer care system, comprising:

using, by a web real-time communication (WebRTC) server executing at least one processor, session initiation protocol (SIP)/hypertext transfer protocol (HTTP) signaling transcoding to invite a customer care operator to a customer care session with a caller;

identifying the customer care operator as a registered operator through a WebRTC browser stored in a non-transitory memory and executed by at least one processor of a computer, wherein the WebRTC browser includes an interface portal for the customer care operator;

displaying, by the computer executing the WebRTC browser, the caller's disposition;

displaying, by the computer executing the WebRTC browser, prior knowledge from a telephony application server (TAS) about the current customer care session;

displaying, by the computer executing the WebRTC browser, interactive hypertext markup language (HTML) web forms to the registered operator;

transcoding, by the WebRTC server, SIP INFO media server control markup language (MSCML) payloads and HTML web forms by a transformation engine;

transmitting, by the computer executing the WebRTC browser to the registered operator, the HTML web forms transformed from SIP INFO MSCML payloads sent by an application server;

transmitting, to the application server, the SIP INFO MSCML payloads transformed from the HTML web forms sent by the registered operator;

defining, by the computer executing the WebRTC browser, the interface portal with instructions contained in the SIP INFO MSCML payloads;

using, by the computer executing the WebRTC browser, instructions from the SIP INFO MSCML payloads to script the registered operator's communication with the caller;

validating, by the application server, the caller's identity; and transferring, by the application server, the caller to a destination number when the caller's identity is validated.

10. The method of claim 9, wherein a single transformation engine can work with more than one registered operator.

11. The method of claim 9, wherein the customer care system is an IP multimedia subsystem (IMS) system.

12. The method of claim 9, wherein the transformation engine communicates with the application server in the same way that a media resource function (MRF) communicates with the application server.

13. The method of claim 12, wherein a SIP INFO MSCML payload is mapped to an HTML web form.

14. The method of claim 9, wherein the customer care system with the registered operator is used for government first responders in emergencies.

15. A method of managing a customer care system, comprising:

using, by a web real-time communication (WebRTC) server executing a transformation engine by at least one processor, session initiation protocol (SIP)/hypertext transfer protocol (HTTP) signaling transcoding to invite a customer care operator to a customer care session with a caller;

displaying, by a computer executing a WebRTC browser stored in a non-transitory memory, interactive hypertext markup language (HTML) web forms to the customer care operator;

mapping, by the transformation of the WebRTC server, a SIP INFO media server control markup language (MSCML) payload to an interactive HTML web form by the transformation engine;

transmitting, by the computer executing the WebRTC browser to the customer care operator, the HTML web forms transformed from SIP INFO MSCML payloads sent by an application server;

transmitting, to the application server, the SIP INFO MSCML payloads transformed from the HTML web forms sent by the customer care operator;

validating, by the application server, the caller's identity; and transferring, by the application server, the caller to a destination number when the caller's identity is validated.

16. The method of claim 15, wherein the customer care system with the customer care operator is used for government first responders in emergencies and wherein the call from a first responder is queued with priority.

17. The method of claim 15, wherein the customer care operator collects a personal identification number (PIN) from the caller during an audio session.

18. The method of claim 17, wherein the collected PIN is input to an HTML web form and transmitted to the application server via the transformation engine.

19. The method of claim 15, wherein the caller calls from a mobile communication device and wherein the mobile communication device is one of a laptop computer, a notebook computer, a tablet computer, a mobile phone, or a personal digital assistant (PDA).

20. The method of claim 19, wherein the mobile communication device is provided with radio communications by a radio frequency transceiver within the mobile communication device based on at least one of code division multiple access (CDMA), global system for mobile communication (GSM), long term evolution (LTE), or worldwide interoperability for microwave access (WiMAX) wireless communication protocols.

\* \* \* \* \*